UNITED STATES PATENT OFFICE.

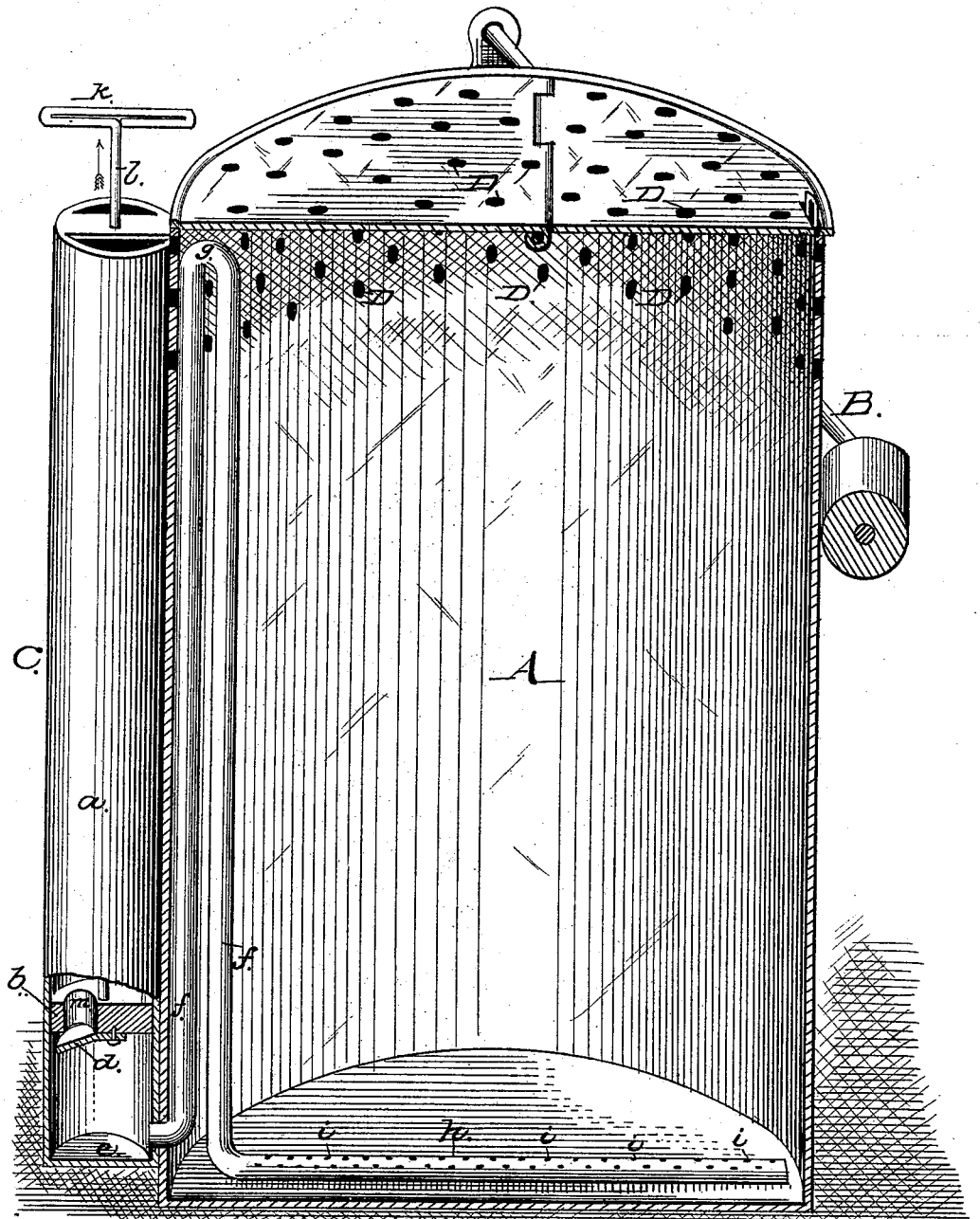

RICHARD K. EVANS, OF WASHINGTON, DISTRICT OF COLUMBIA.

BAIT-FISH CAN.

SPECIFICATION forming part of Letters Patent No. 299,765, dated June 3, 1884.

Application filed January 7, 1884. (No model.)

*To all whom it may concern:*

Be it known that I, RICHD. K. EVANS, of the city of Washington, District of Columbia, have invented a new and Improved Angler's Bait-Can; and I hereby declare the following to be a full, clear, and exact description of the same, reference being had to the accompanying drawing, making part of this specification, in which the figure is a vertical sectional view of my improved angler's bait-can.

My invention relates to bait-cans in which anglers carry live bait to be used in fishing, and has for its object to prevent the frequent changes of water in the can, as has heretofore been necessary to keep the bait alive. In carrying live fish or bait-fish a long distance in a vehicle or on the cars, great inconvenience is experienced in the necessarily frequent changing of the water on the bait-fish to keep them alive. If the water is not changed frequently, the fish die from the exhaustion of the air mechanically entangled in the water which they absorb in breathing.

My invention consists in means for readily replacing in the water, without changing it, such an amount of atmospheric air as will fully support the lungs of the bait-fish and keep them alive, all of which will be hereinafter fully described, and specifically pointed out in the claims.

In order that those skilled in the art may make and use my invention, I will proceed to describe the manner in which I have carried it out.

In the said drawing, A is a portable bait-fish can of any desired construction, and B the bail by which to carry it. At a convenient place on the side of the can, so as not to interfere with the bail or lid of the bucket or can, I place an air-pump, C, in this instance having a single barrel, $a$, a piston, $b$, provided with a downwardly-opening valve, $d$, and a solid end, $e$, to the barrel. Near its lower end the barrel $a$ is provided with a pipe, $f$, opening into it through the wall of the can, and passing upward to a point, $g$, where it is given a sharp return-bend and brought down to the bottom of the can and bent across its bottom, as seen at $h$. The portion $h$ of the pipe lying across the bottom of the bucket is filled with minute perforations, $i\ i$, for the escape of air from the pipe.

The operation is as follows: The can being filled with water up to the line of perforations D D, and the bait-fish in it, so soon as the fish are noticed coming to the surface it indicates the lack of a proper amount of air in the water. The piston $b$ is at once reciprocated by means of the handle $k$ and rod $l$. As the piston is raised air rushes through the opening $m$ past the valve $d$ into the barrel. As the piston is forced downward the valve closes and the air in the barrel is forced through pipe $f$ and out of the perforations $i\ i$, and as it rises through the water a proportion is held mechanically by the water, and the bait-fish provided with a new supply of air to support life. The operation is repeated as often as is deemed necessary.

It is evident that the air-pump may be located within the bait-bucket and have the rod $l$ protrude through the cover without departing from the spirit of my invention.

I am fully aware that it is not broadly new to aerate water to sustain the life of fish therein contained, and hence I make no claim thereto; but,

Having thus described my invention, what I claim as new, and desire to secure by Letters Patent, is—

1. The portable bait-can A, in combination with an air-pump, C, and a pipe to conduct the air from the pump to a point below the surface of the water in the bait-can, for the purpose set forth.

2. The can A and air-pump C, in combination with the pipe $f$, provided with the return-bend $g$ and perforated section $h$, all constructed, arranged, and operated as described.

RICHD. K. EVANS.

Witnesses:
H. A. HALL,
W. E. CHAFFEE.